United States Patent [19]
Butler

[11] 3,822,498
[45] July 9, 1974

[54] AERATOR FOR A FISH LIVE WELL

[76] Inventor: Don T. Butler, 7715 E. 25 Pl., Tulsa, Okla.

[22] Filed: Mar. 2, 1973

[21] Appl. No.: 337,455

[52] U.S. Cl. .............................................. 43/57
[51] Int. Cl. ................................. A01k 97/04
[58] Field of Search ............ 43/55, 56, 57; 119/3, 5

[56] References Cited
UNITED STATES PATENTS
| | | | |
|---|---|---|---|
| 2,936,542 | 5/1960 | Butler et al. | 43/57 |
| 3,302,789 | 2/1967 | Holt | 119/5 |

*Primary Examiner*—Warner H. Camp
*Attorney, Agent, or Firm*—Head & Johnson

[57] ABSTRACT

An aerator for a fish live well including a vessel having open top and a first and second opening therein, the vessel being positionable in water so at least one of the openings is below the water surface to thereby establish a water level in the vessel, a pump positioned in the vessel having an intake below the water surface, a foraminous water distributor positioned within the vessel and above the water level, a conduit connecting the pump output to a tee fitting, another conduit connecting the tee fitting to the foraminous water distributor whereby water pumped by the pump passes out through the water distributor and through the air before re-entering the water, the second conduit connected from the tee fitting to the second outlet whereby the water pumped by the pump is forced out of the vessel thereby lowering the water level and causing water to flow into the vessel through the first opening, and valve means in each of the conduits leading from the tee fitting to control the ratio of water passing through the water distributor and passing out of the vessel.

5 Claims, 2 Drawing Figures

PATENTED JUL 9 1974   3,822,498

AERATOR FOR A FISH LIVE WELL

BACKGROUND, SUMMARY AND OBJECTS OF THE INVENTION

Live wells have been utilized by some fishermen as a means of keeping their catch alive, however, most fishermen today still use a fish stringer to keep fish alive as long as possible. Fish stringers are not completely effective in maintaining caught fish in live conditions. First, the placement of any type of device to the mouth or gills of fish interferes greatly with the breathing of the fish. Second, the fish stringer limits movement of the fish through the water and thereby reduces the ability of the fish to pass water through the gills. Third, fish placed on a stringer are easily entangled with lines, especially when a fish is being retrieved, and fish on stringers can be crushed between the boat and the bank or bottom of the lake or stream being fished.

Another problem with fish placed on stringers is that they must be taken in the boat when the boat is in motion at any other than a low rate of speed. Thus when a fisherman is moving from one location to another or coming to home base after fishing the fish must be taken out of the water and placed in the boat and thereby frequently suffocated before they can be returned to the water.

While in the past the fact that most fish caught do not survive for any long length of time was not considered a serious problem since most fish caught were ultimately cleaned and prepared for cooking. However, in recent years catching of fish as a sport has become increasingly popular. Due to the heavy concentration of fishing effort in lakes wherein fishing tournaments are held there has developed a desire that the caught fish be preserved in live condition. After weighing to determine the performance of a contestant, the fish can then be released back into the water from which they came so that a fishing contest or tournament does not deplete the fish life in the lake in which the contest or tournament is held.

While, as mentioned above, the use of live wells has previously been employed by fishermen, the wells as used are not effective in preserving the live condition of fish. Because of space limitation the live wells in most boats are, of necessity, restricted in size. Thus the oxygen level in a live well is soon depleted by fish placed therein and, in addition, in hot weather the temperature of the water in the live well can soon rise to the level wherein the livability of fish is greatly diminished.

This invention provides a live well having improved means of increasing fish livability. One of the aspects of the live well of this invention includes the use of an aerator. The use of aerators has been known previously and is commonly employed in aquariums and so forth to maintain oxygen level of water wherein fish are kept. However, the use of an aerator alone has not been found to be completely effective for maintaining high livability of game fish placed in a live well in a boat. This invention provides an improvement in the use of an aerator and thereby provides a live well having greatly improved fish livability.

It is therefore an object of this invention to provide an improved fish live well.

More particularly, an object of this invention is to provide a fish live well having improved livability for fish, the live well being particularly adaptable for use in a boat for keeping of game fish, and including improved means of simultaneously aerating and recirculating water in a controlled arrangement for maximum effective livability of game fish.

These general objects, as well as more specific objects of the invention will be set forth in the following description and claims, taken in conjunction with the attached drawings.

DESCRIPTION OF THE VIEWS

DETAILED DESCRIPTION

Figure 1:
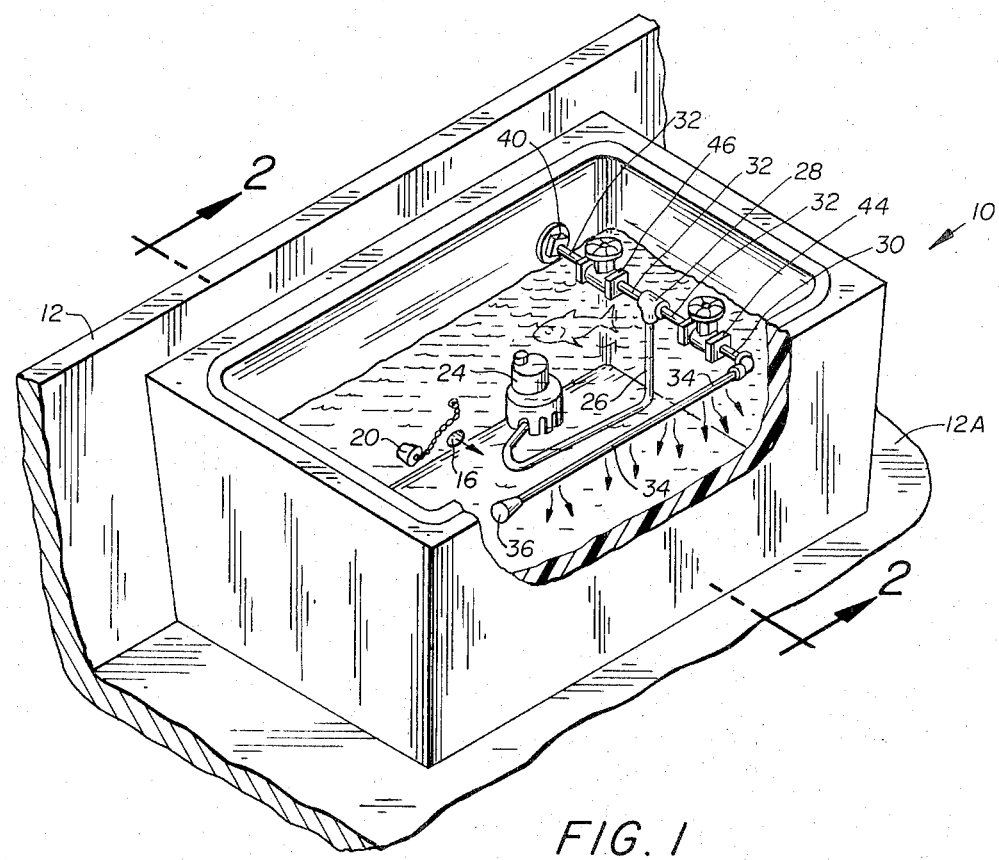
FIG. 1 is an isometric view of the fish live well as positioned within a boat. One wall of the fish live well is partially cut away.
Figure 2:
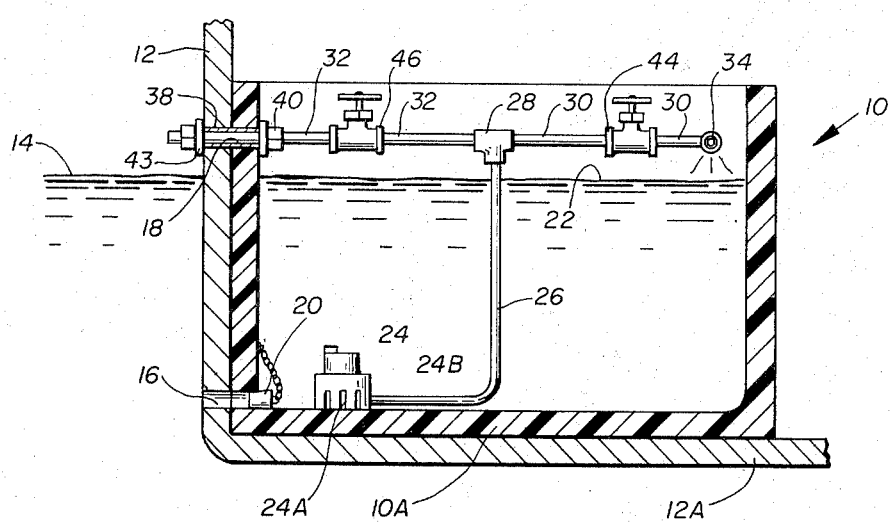
FIG. 2 is a cross-sectional view taken along the line 2—2 of FIG. 1.

Referring to the drawings, the improved fish live well of this invention is generally indicated by the numeral 10. While the invention describes a live well which can be utilized in any environment wherein the well is placed partially below the surface of the body of water, it is particularly useful in fishing boats and is shown mounted within a boat and against the wall 12 of the boat. The live well to be described is particularly useful in fishing boats by those engaged in the sport of fishing wherein a desire exists to maintain the fish caught in a high state of livability so that they may be released after being weighed. However, the invention is not so limited but is useful for any application wherein it is the desire to maintain the livability of fish, even if for the purpose of preventing spoilage of the fish which are going to be subsequently eaten.

The live well 10 is shown without a lid, however it is desirable that a lid be provided to keep the sun out of the water in the well, to prevent fish from jumping out of the well, and to provide a surface for convenience of use in the boat.

The live well is positioned such that the bottom 10A which is shown sitting on the bottom 12A of the boat in which it is positioned, is below the surface 14 of the body of water. The live well is provided with a first opening 16 and a second opening 18. At least one of the openings (in the illustrated arrangement first opening 16) is positioned below the surface 14 of the body of water in which the live well is utilized. The second opening 18 may be positioned any place which communicates with the exterior of the boat wall 12 but is preferably positioned to be above the surface of water 14. A removable closure 20, such as a stopper or the like, is utilized to selectively close the first opening 16. With stopper 20 removed as shown water is free to flow through first opening 16 so that a water level 22 is maintained within the well 10 substantially equal to the water level 14 in the body of water in which the boat is positioned.

With water in the well fish may be placed therein but, as previously stated, fish would soon exhaust the oxygen in the water within the well and, in summer the temperature of the water in the well would soon rise so as to endanger the fish. This invention provides means of controlling the water in the well 10 such as to enhance substantially the livability of the fish.

Positioned within the well in the lower portion thereof is a pump. The pump 24 is preferably electrically operated. A pump of the type operated by the boat battery system is preferred. Conductors from the pump 24 to the source of electricity are not shown as such are readily known and typically include the use of a switch so that pump 24 may be energized when desired. Pump 24 includes an inlet 24A and an outlet 24B. While pump 24 is illustrated as the submerged type it may be of any type as long as inlet 24A is below the water surface.

Extending from pump outlet 24B is a conduit 26 which connects with a tee fitting 28. Connected to one outlet of the tee fitting is a first conduit 30 and to the other outlet a second conduit 32. Positioned within the upper interior surface of the well 10 is a foraminous water distributor 34. While the size and shape of the distributor 34 may vary considerably, a pipe having holes drilled at spaced intervals performs completely satisfactorily. The end of the distributor 34 is closed at 36 so that water passing into the distributor passes out through openings as small jets of water. The distributor 34 is mounted above the surface 22 of the water within the well so that the water which passes out of the distributor as small jets passes through the air before striking the water surface 22. In this way the recirculated water picks up air to replenish the oxygen consumed by the fish in the water.

Second conduit 32 extends from tee fittings 28 to the second opening 18 in the live well vessel. As a practical means, a threaded pipe 38 may extend through opening 28 in the live well vessel 10 and corresponding opening in the boat wall 12. A flange 40 at the inner end suitably engages the interior of the live well vessel 10 and an opposing flange 43 is threaded on the pipe 38 at the outside of the boat so as to sealably secure the passage of water from conduit 32 to the exterior of the boat.

Water pumped by pump 24 flows through supply conduit 36, to tee fitting 28, to second conduit 32 and out through the threaded pipe 38 to the exterior of the boat. The water which follows their route tends to lower the water level 22 within the live well vessel 10 and thereby causing fresh water to be drawn through openings 16 into the vessel to maintain the water level therein. Thus, the water circulated by pump 24 which passes through the second outlet 18 causes a recirculation of water from the interior to the outside of the boat thus drawing water from the outside of the boat into the well.

Positioned in first conduit 30 is a manually controlled valve 44, and in like manner, positioned in second conduit 32 is a manually controlled valve 46. The use of valves 44 and 46 greatly enhances the variety of uses of the improved live well. With valves 44 and 46 each opened and pump 24 energized, water moved by the pump is partially distributed through the water distributor 34, aerated and passed back into the interior of the vessel. In addition, water is partially distributed through second outlet 18 to the exterior of the vessel thereby causing the inflow of water through first openings 16 to maintain the water level within the vessel. Thus, by this arrangement, with both valves 44 and 46 open, or at least both partially open, pump 24 not only serves to aerate the water from distributor 34 but to recirculate the water to obtain a continuous change of the water within the vessel. In this way the water is not only aerated but continuously changed so as to maintain the temperature of the water essentially that of the body of water in which the boat is situated and thereby the body of water to which the fish within the live well vessel are acclimated.

If the boat is to be run at high speeds wherein there would be a tendency to draw water out of first opening 16, it may be closed with the closure member 20. Valve 46 may be closed and thereby all of the output from pump 24 recycled to distributor 34 and aerated back into the interior of the vessel so that the water level in the vessel is not lowered even though no recirculation is taking place.

Under very cool conditions aeration of the water not only may not be desired but may tend to cause the temperature of the water in the live well vessel to become lower than that to which the fish is acclimated. Under these conditions valve 44 may be closed and valve 46 opened so that all of the output of pump 24 is utilized to recirculate the water without aeration.

In addition, if the boat is to be taken from the water, the first openings 16 may be closed by stopper 20 and valve 46 closed. Thus the water from pump 24 is all cycled through the distributor 34 for aeration while maintaining the level of water within the vessel even after removal of the boat from the water.

Thus it can be seen that all of the objects set forth initially for the invention are fulfilled in the apparatus described. The invention provides a greatly improved and highly effective means of maintaining the livability of fish and substantially decreases the rate of mortality of fish caught. The use of the apparatus will enable a sports fisherman to return a substantially larger percentage of his catch back to the lake or stream from which they are taken and thereby maintain the fish population.

The use of valve 44 is optional. Without valve 44 the ratio of water aerated through distributor 34 compared to that recycled back to the exterior of the vessel through opening 18 is controlled by valve 46. The openings providing the jets of water in distributor 34 serve in the nature of an orifice so that flexibility of the apparatus to proportion the water recirculated versus water aerated can be achieved with only valve 46. The use of valve 44, however, is an extra refinement permitting ready adjustment of the function and operation of the device for greater flexibility under varying conditions for optimum fish livability.

While the invention has been described with a certain degree of particularity it is manifest that many changes may be made in the details of construction and the arrangement of components without departing from the spirit and scope of the disclosure. It is understood that the invention is not limited to the embodiment set forth herein for purposes of exemplification, but is to be limited only by the scope of the attached claim or claims, including the full range of equivalency to which each element thereof is entitled.

What is claimed:

1. A fish live well having improved fish livability comprising:
   a vessel having an open top, the vessel having a first and a second opening therein and positionable in water such that at least said first opening is below the water surface whereby a water level is provided in said vessel;
   a pump having an intake positioned adjacent the interior bottom of said vessel and an outlet;
   a foraminous water distributor positioned within said vessel and above the water level;
   a first means connecting said pump outlet of said pump to said water distributor whereby water is recirculated to pass out of said distributor and through the air before striking the water surface;

second means connecting said pump outlet to said vessel second opening; and means of proportioning the flow of water from said pump outlet between said water distributor and said vessel second outlet.

2. An aerator for a fish well according to claim 1 including:

a tee having a first branch connected to said pump outlet;

a first conduit connecting a second branch of said tee to said water distributor; and a second conduit connecting a third branch of said tee to said vessel second opening.

3. An aerator for a fish well according to claim 2 wherein said means of proportioning the flow of water from said pump outlet between said water distributor and said vessel second outlet includes a valve in one of said conduits.

4. An aerator for a fish well according to claim 2 wherein said means of proportioning the flow of water from said pump outlet between said water distributor and said vessel second outlet includes a valve in said first conduit and a valve in said second conduit.

5. An aerator for a fish well according to claim 1 including means of selectably closing said vessel first opening.

* * * * *